(12) United States Patent
Starling

(10) Patent No.: US 6,758,510 B1
(45) Date of Patent: Jul. 6, 2004

(54) VEHICLE A-PILLAR TRIM COMPONENTS WITH INTEGRATED REAR-VIEW MIRRORS

(75) Inventor: Matt Starling, Ypsilanti, MI (US)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 10/407,743

(22) Filed: Apr. 4, 2003

(51) Int. Cl.⁷ .............................................. B62D 25/04
(52) U.S. Cl. ............................... 296/39.1; 296/193.06; 296/1.11; 359/871
(58) Field of Search .................. 296/39.1, 190.07, 296/193.06, 97.2, 1.07, 1.08, 1.11, 200, 152, 190.01, 190.05, 190.08; 359/871, 876

(56) References Cited

U.S. PATENT DOCUMENTS

| | | | |
|---|---|---|---|
| 1,567,169 A | 12/1925 | Patterson | |
| 3,806,232 A | 4/1974 | Gray | 350/303 |
| 4,815,689 A * | 3/1989 | Schiff | 359/855 |
| 4,991,815 A * | 2/1991 | Softness | 359/876 |
| 5,054,900 A | 10/1991 | Simson | 359/851 |
| 5,113,292 A | 5/1992 | Simson | 359/851 |
| 5,192,110 A | 3/1993 | Mykytiuk et al. | 296/97.8 |
| 5,235,469 A | 8/1993 | Horian | 359/851 |
| 5,338,252 A | 8/1994 | Bowler et al. | 454/155 |
| 5,569,076 A | 10/1996 | Sudak et al. | 454/155 |
| 5,690,550 A | 11/1997 | Mikowski | 454/155 |
| 5,741,179 A | 4/1998 | Sun et al. | 454/15 |
| 5,746,651 A | 5/1998 | Arajs et al. | 454/154 |
| 5,752,877 A | 5/1998 | Sun | 454/155 |
| 5,835,294 A | 11/1998 | Minegishi | 359/857 |
| 5,886,838 A | 3/1999 | Kuramoto | 359/841 |
| 5,947,813 A | 9/1999 | Chow et al. | 454/155 |
| 6,059,653 A | 5/2000 | Gehring et al. | 454/155 |
| 6,129,627 A | 10/2000 | Jankowski et al. | 454/155 |
| 6,158,796 A * | 12/2000 | Weber | 296/39.1 |
| 6,183,096 B1 * | 2/2001 | Galicia | 359/871 |
| 6,273,576 B2 * | 8/2001 | Galicia | 359/871 |
| 6,350,037 B1 | 2/2002 | Adams | 359/843 |
| 6,390,632 B1 | 5/2002 | Palathingal | 359/850 |
| 2002/0024751 A1 * | 2/2002 | Guttenberger | 359/879 |

* cited by examiner

*Primary Examiner*—Jason Morrow
(74) *Attorney, Agent, or Firm*—Myers Bigel Sibley & Sajovec

(57) ABSTRACT

Interior trim components for vehicles include a trim panel configured to be attached to an A-pillar of a vehicle. The trim panel is a multilayer composite and an exposed layer includes one or more reflective elements constructed and arranged to provide a rear view image to a driver of the vehicle. A housing may be provided that is movably mounted to the trim panel and that is rotatable about a first axis. A reflective element is movably mounted to the housing and rotatable about a second axis transverse to the first axis.

6 Claims, 5 Drawing Sheets

VEHICLE A-PILLAR TRIM COMPONENTS WITH INTEGRATED REAR-VIEW MIRRORS

FIELD OF THE INVENTION

The present invention relates generally to vehicles and, more particularly, to rear-view mirrors for vehicles.

BACKGROUND OF THE INVENTION

Motor vehicles are typically provided with one or more interior and/or exterior rear-view mirrors that allow drivers to see behind a vehicle. Even with multiple conventional rear view mirrors, there is typically an area behind a vehicle that may be difficult to see. This area is referred to as the "blind spot." Various attempts have been made to overcome the blind spot limitation of conventional rear-view mirrors. See, for example, U.S. Pat. No. 6,350,037 to Adams, and U.S. Pat. No. 6,390,632 to Palathingal. However, vehicle manufacturers are continuously looking for ways to enhance vehicle safety and to reduce manufacturing costs.

SUMMARY OF THE INVENTION

In view of the above discussion, interior trim components for vehicle A-pillars that contain one or more integrated rear-view mirrors are provided. According to embodiments of the present invention, a trim component includes a multilayer composite having an exposed or outer layer that includes one or more reflective elements constructed and arranged to provide a rear view image to a driver of a vehicle. According to other embodiments of the present invention, an interior trim component includes a trim panel having a housing that is movably mounted thereto and that is rotatable about a first axis. A reflective element is movably mounted to the housing and is rotatable about a second axis transverse to the first axis. The reflective element is user-adjustable about the first and second axes to provide an adjustable rear view to a driver of a vehicle.

DETAILED DESCRIPTION OF THE INVENTION

Figure 1:
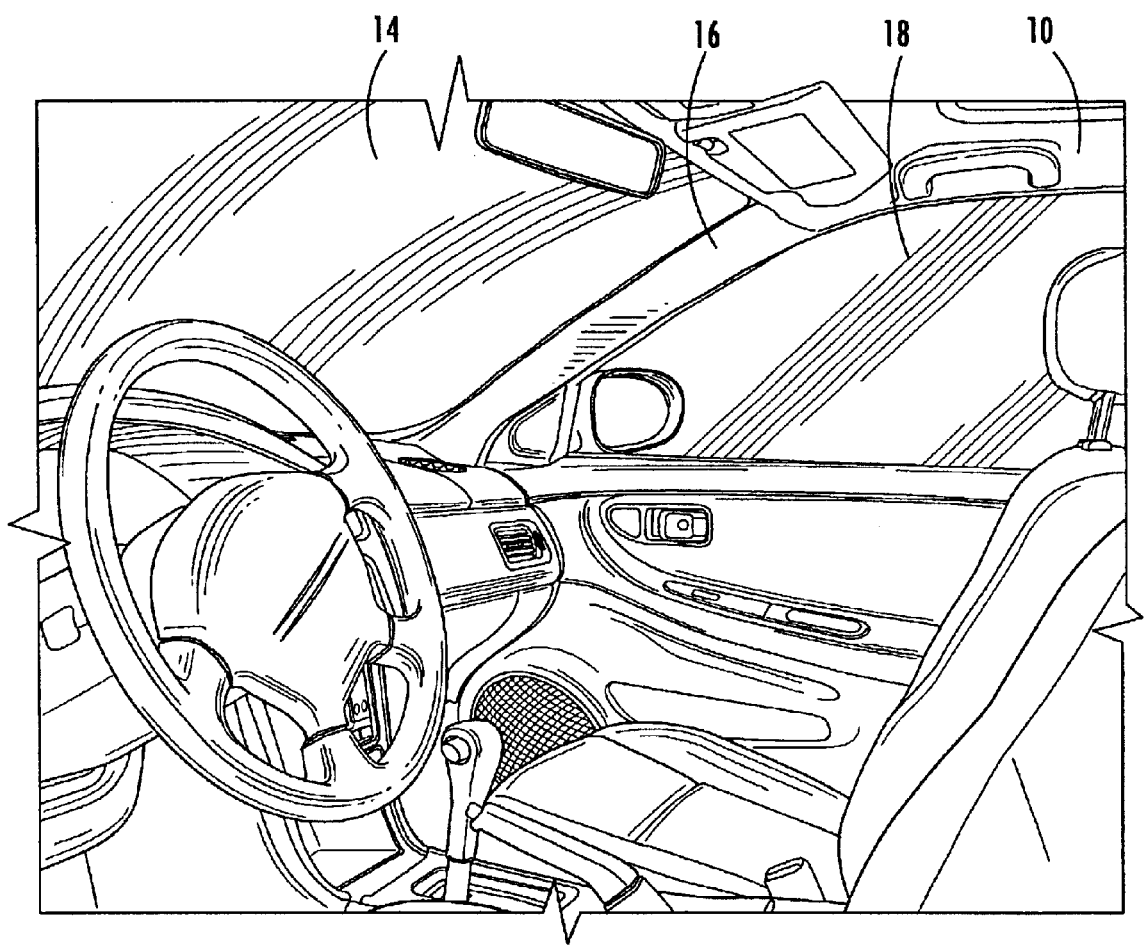
FIG. 1 is a perspective view of a portion of a passenger compartment of a vehicle.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Referring to FIG. 1, a portion of a vehicle 10 is illustrated with a front windshield 14 and a pillar 16 located at both ends of the windshield 14 (only one pillar 16 is illustrated in FIG. 1 for clarity). Pillars 16 are known in the automobile industry as "A-pillars" and separate the windshield 14 from the side door windows 18. A-pillars typically are members that lend structural support to a vehicle body and roof.

A-pillars are typically covered with trim material and may support one or more speakers for a s vehicle sound system. Trim material may be used to present an aesthetically pleasing appearance in the interior of a vehicle, to absorb energy in the event of an impact or collision, as well as to reduce noise levels within a vehicle.

Figure 2:
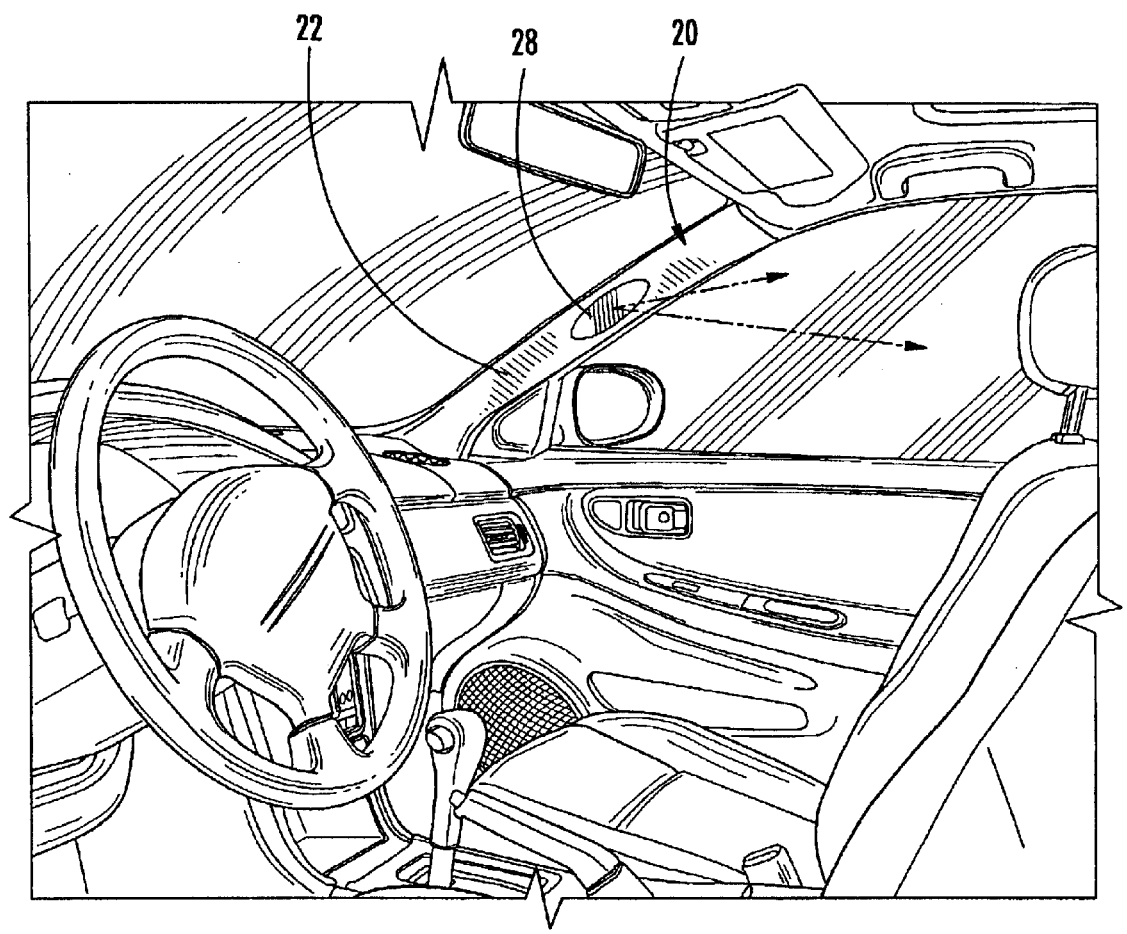
FIG. 2 is a partial perspective view of an A-pillar trim component having a single rear-view mirror according to embodiments of the present invention.
Figure 3:
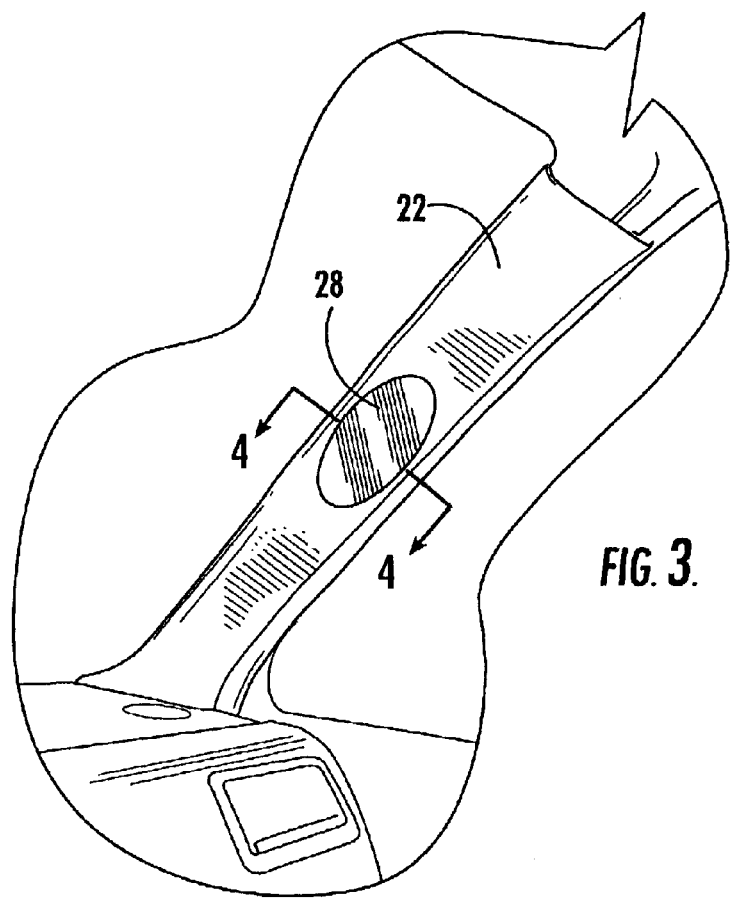
FIG. 3 is a partial, enlarged perspective view of the trim component of FIG. 2.
Figure 4:
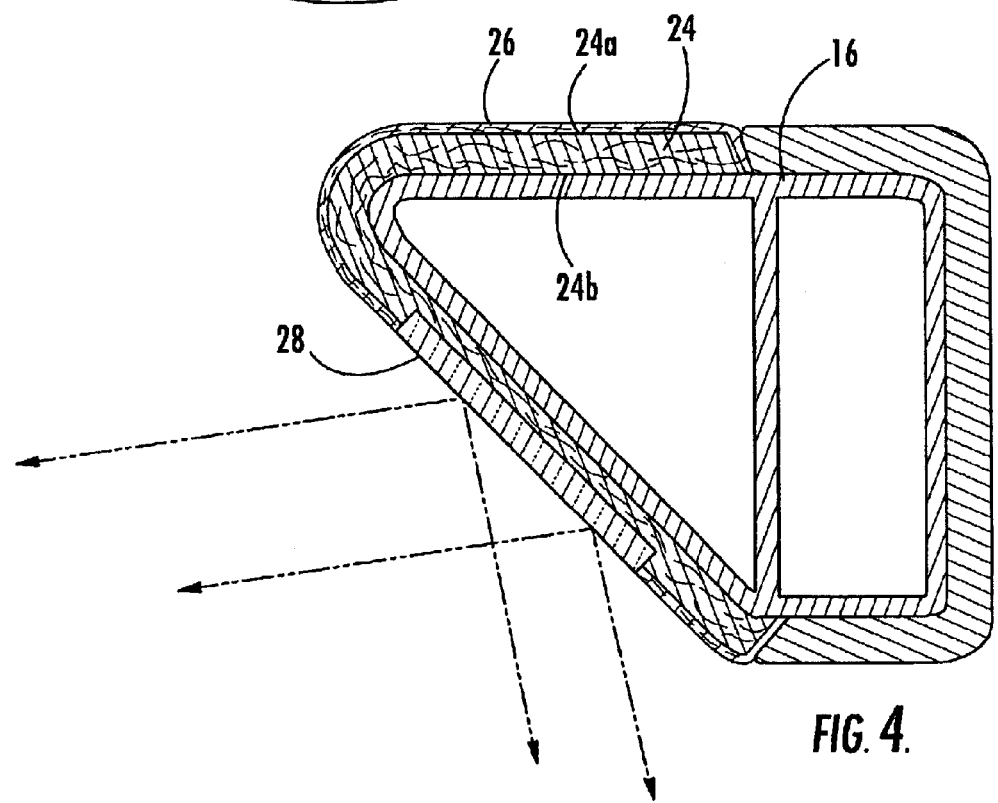
FIG. 4 is a section view of the trim component of FIG. 2 taken along line 4—4.

Referring now to FIGS. 2–4, a portion of an interior trim component 20 for a vehicle, according to embodiments of the present invention, is illustrated. The illustrated interior trim component 20 includes a trim panel 22 that is attached to an A-pillar and that includes a reflective element or mirror 28. Referring to FIG. 4, the illustrated trim panel 22 is a multilayer composite. The base layer 24 is attached to the A-pillar 16 in a conventional manner and may be formed from various types of material. For example, the base layer 24 may be, but is not limited to, synthetic and/or natural polymeric material, such as foam or fiber. The base layer 24 includes opposite first and second surfaces 24a, 24b. The base layer second surface 24b is configured to be adhesively, or otherwise, attached to the A-pillar 16.

A layer of trim material 26 is secured to the base layer first surface 24a. In addition, a mirror element 28 is attached to the base layer first surface 24a, as illustrated, and is configured to provide a rear view image to a driver. Trim layer 26 may be various types of materials. For example, trim layer 26 may be fabric, polymeric material, wood, etc.

Mirror 28 may have various shapes and sizes and is not limited to the illustrated configuration. For example, mirror 28 may have any polygonal or arcuate configuration including, but not limited to, a rectangular shape, a round shape, an oval shape, an elliptical shape, and/or a triangular shape. Moreover, mirror 28 may be configured to conform with any type of configuration of a trim component to which the mirror 28 is attached.

Trim components, according to embodiments of the present invention, may have various layers of material. Embodiments of the present invention are not limited to the two layers illustrated in FIG. 3.

In the illustrated embodiment of FIG. 4, the mirror element 28 is substantially flush with the trim layer 26.

However, in other embodiments of the present invention, mirror element 28 need not be substantially flush with the trim layer 26. For example, a mirror 28 may be configured such that one or more portions thereof extends above the trim layer 26 and one or more portions thereof extends below the trim layer 26.

According to embodiments of the present invention, mirror 28 may be formed from glass, plastic, film, metal, composites, and/or combinations thereof. An exemplary material for mirror element 28 may be a formed laminate (e.g., Radiant Mirror Film from 3M Company, Thermark® Decorative Laminates from Avery Denison). A trim component according to embodiments of the present invention may be formed by placing a layer of reflective material within a mold and molding the reflective material to a trim panel.

According to embodiments of the present invention, a mirror element may be a preformed element. According to other embodiments of the present invention, a mirror element may be a film trimmed to a desired size. A preformed element and/or a trimmed film is then located and held in place within in an injection mold. An injection molding process is then used to produce an A-Pillar part having a mirror element therein.

Alternatively, thermoforming or wrapping operations used to create various polymeric coverings may be utilized, s without limitation. According to embodiments of the present invention, mirror material and trim layer material are the same or similar materials to reduce the effects of different coefficients of thermal expansion.

Figure 5:
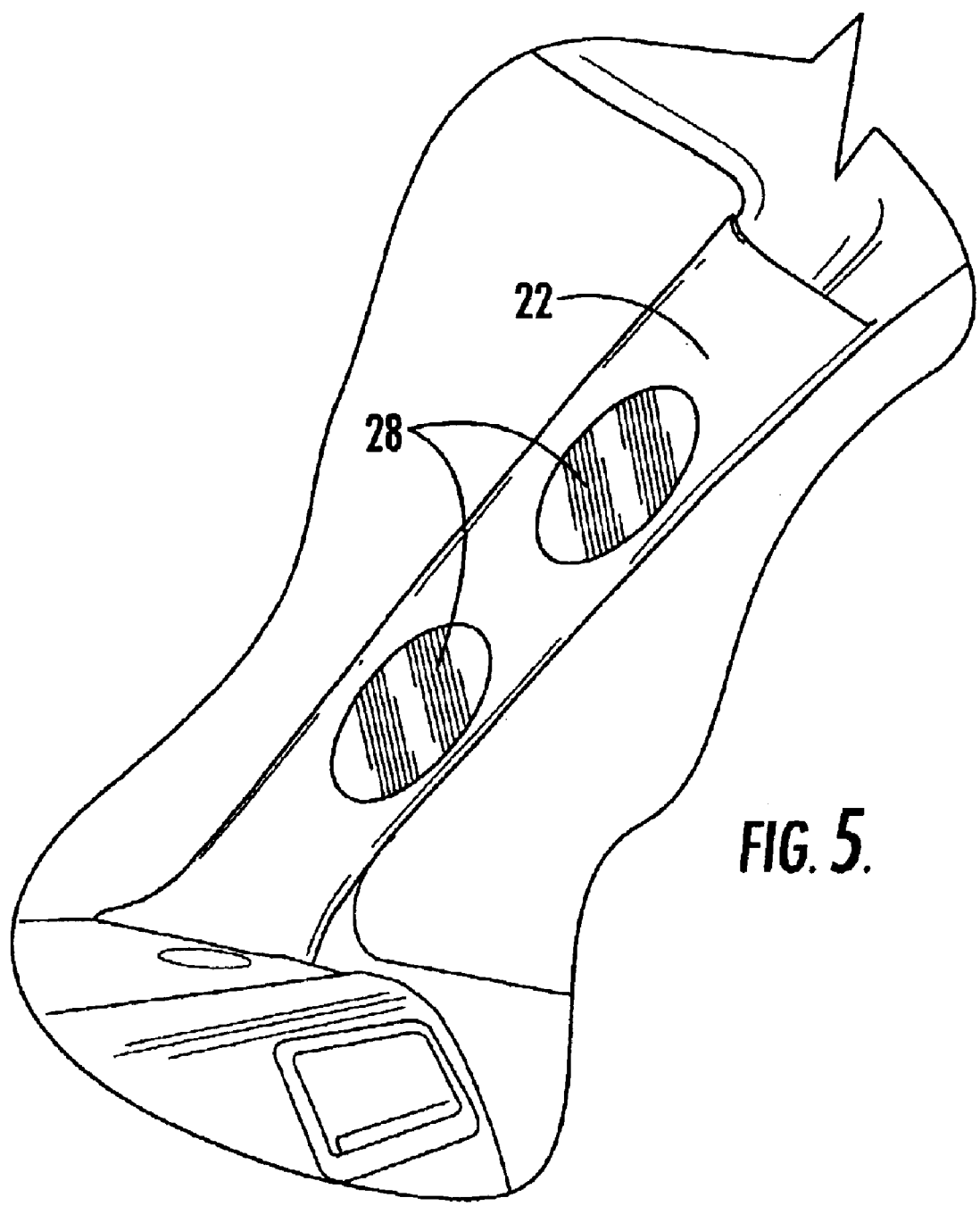
FIG. 5 is a partial perspective view of an A-pillar trim component having multiple rear-view mirrors according to embodiments of the present invention.

Referring to FIG. 5, a trim component according to embodiments of the present invention may include multiple mirrors 28. Each mirror 28 may be positioned in various locations on a trim panel 22 and may have various shapes and configurations, as described above.

Figure 6:
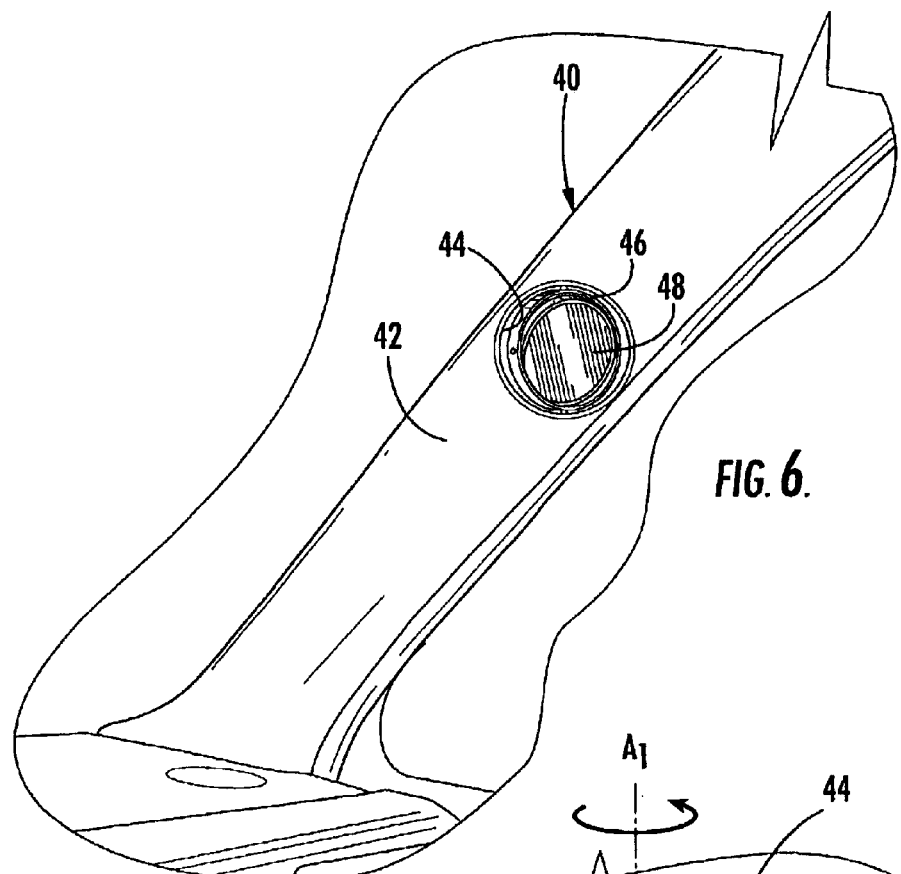
FIG. 6 is a partial perspective view of an A-pillar trim component having an adjustable rear-view mirrors according to embodiments of the present invention.
Figure 7:
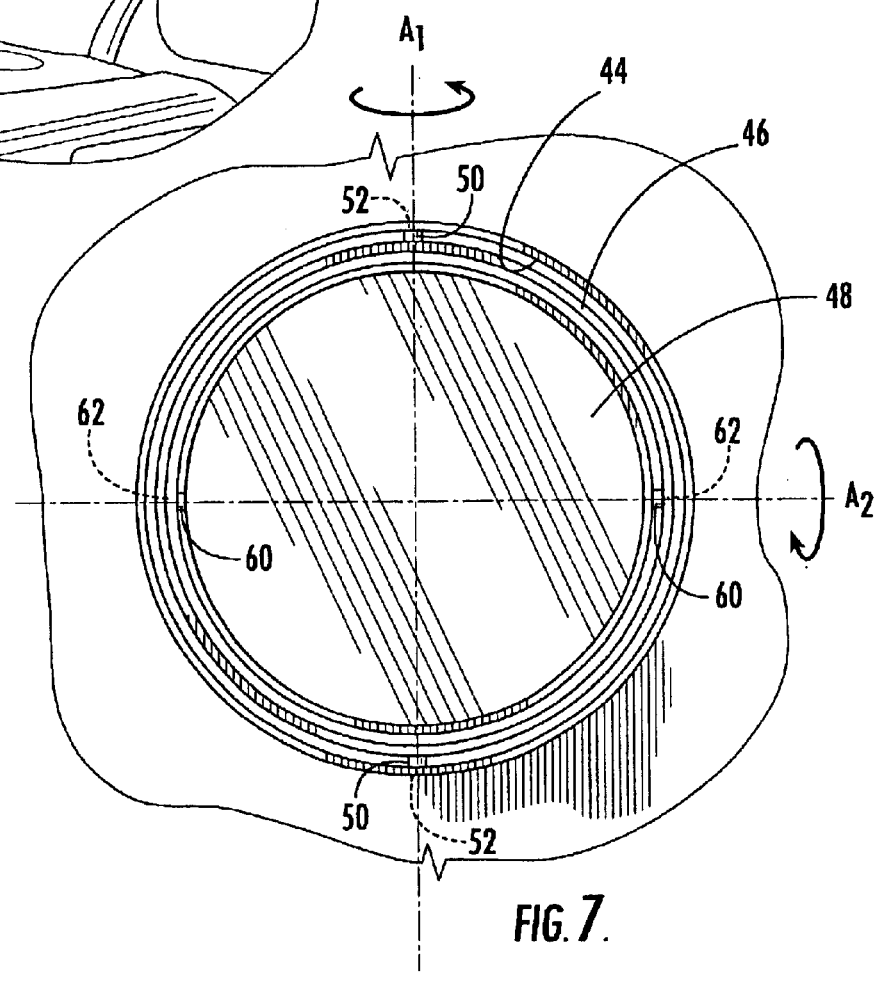
FIG. 7 is an enlarged view of the adjustable rear-view mirror of FIG. 6.

Referring to FIG. 6, a portion of an interior trim component 40 for a vehicle, according to embodiments of the present invention, is illustrated. The illustrated interior trim component 40 includes a trim panel 42 that is configured to be attached to an A-pillar of a vehicle in a conventional manner. The trim panel 42 has an aperture 44 formed therein. A housing 46 is movably mounted to the trim panel within the aperture 44, as illustrated, and is rotatable about a first axis $A_1$. A mirror 48 is movably mounted to the housing 46 and is rotatable about a second axis $A_2$. The second axis $A_2$ is transverse to the first axis $A_1$. Rotatable movement of the housing 46 and mirror 48 about the first and second axes $A_1$, $A_2$ renders the mirror 42 user-adjustable so as to provide an adjustable rear view image to a driver of the vehicle.

In the illustrated embodiment, housing 46 is rotatably mounted to the trim panel via opposite pins 50 which engage respective apertures 52 in trim panel 42. However, various ways of rotatably mounting the housing 46 to the trim panel 42 may be utilized without limitation. Mirror 48 is rotatably mounted to the housing 46 via opposite pins 60 which engage respective apertures 62 in the housing 46. However, various ways of rotatably mounting the mirror 48 to the housing 46 may be utilized without limitation.

Housing 46 may be formed from various materials including, but not limited to, polymeric materials, metals, etc.

Various features commonly employed with conventional rear-view and side-view mirrors may be incorporated into embodiments of the present invention. For example, movement of mirror 48 and housing 46 may be controlled via electrical actuators. In addition, mirrors 28, 48 may be heated, tinted, have a glare absorption coating, and/or have controlled distortion such as convex, concave and spherical, prismatic day/night viewing, light-sensitive photo optic shading, safety lamination, surface coatings and the like.

A housing having a mirror therein according to embodiments of the present invention may be movably mounted to an A-pillar of a vehicle in various ways. For example, a housing may be movably mounted to an A-pillar of a vehicle in ways similar to how air vents are movably mounted to instrument panels in U.S. Pat. Nos.: 5,338,252; 5,569,076; 5,690,550; 5,741,179; 5,746,651; 5,752,877; 5,947,813; 6,059,653; and 6,129,627; each of which is incorporated herein by reference in its entirety.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. The present invention is defined by the following claims, with equivalents of the claims to be included therein.

What is claimed is:

1. An interior trim component for a vehicle, comprising a trim panel configured to be attached to an A-pillar of a vehicle, wherein the trim panel comprises a multilayer composite, and wherein an exposed layer of the composite comprises a reflective element that is constructed and arranged to provide a rear-view image to a driver of the vehicle, and wherein the reflective element is substantially flush with the trim panel.

2. The interior trim component of claim 1, wherein the exposed layer of the composite comprises a plurality of reflective elements that are constructed and arranged to provide a rear-view image to a driver of the vehicle.

3. The interior trim component of claim 1, wherein the reflective element and trim panel are formed from material having similar coefficients of thermal expansion.

4. A vehicle, comprising:

an A-pillar; and
a trim component attached to the A-pillar, wherein the trim component comprises a multilayer trim panel having a reflective element that is constructed and arranged to provide a rear view image to a driver of the vehicle, and wherein the reflective element is substantially flush with the trim panel.

5. The vehicle of claim 4, wherein the trim panel comprises a plurality of reflective elements that are constructed and arranged to provide a rear view image to a driver of the vehicle.

6. The vehicle of claim 4, wherein the reflective element and trim panel are formed from material having similar coefficients of thermal expansion.

* * * * *